US011706180B2

(12) United States Patent
Iida (10) Patent No.: US 11,706,180 B2
(45) Date of Patent: Jul. 18, 2023

(54) TERMINAL DEVICE AND INFORMATION PROCESSING APPARATUS CAPABLE OF EXECUTING MESSAGE DISPLAY PROGRAM THAT PERFORMS DIFFERENT TYPES OF PROCESSING BETWEEN WHEN HIGH-IMPORTANCE MESSAGE IS DISPLAYED ON DISPLAY DEVICE AND WHEN HIGH-IMPORTANCE MESSAGE IS NOT DISPLAYED ON DISPLAY DEVICE, AND NON-TRANSITORY COMPUTER-READABLE RECORDING MEDIUM WITH MESSAGE DISPLAY PROGRAM STORED THEREON

(71) Applicant: KYOCERA Document Solutions Inc., Osaka (JP)

(72) Inventor: Daichi Iida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 218 days.

(21) Appl. No.: 17/244,666

(22) Filed: Apr. 29, 2021

(65) Prior Publication Data
US 2021/0352036 A1 Nov. 11, 2021

(30) Foreign Application Priority Data
May 8, 2020 (JP) ................................ 2020-082588

(51) Int. Cl.
*G06F 15/16* (2006.01)
*H04L 51/226* (2022.01)
(Continued)

(52) U.S. Cl.
CPC .......... *H04L 51/226* (2022.05); *G06F 3/0485* (2013.01); *G06F 16/313* (2019.01); *H04L 51/04* (2013.01); *H04L 51/224* (2022.05)

(58) Field of Classification Search
CPC ..... H04L 51/226; H04L 51/04; H04L 51/224; G06F 3/0485; G06F 16/313; G06F 2203/04803
See application file for complete search history.

(56) References Cited

U.S. PATENT DOCUMENTS 10,741,215 B1 * 8/2020 Sundareson .......... H04L 67/535
11,175,806 B1 * 11/2021 McCue ................. G06F 3/0482
(Continued)

FOREIGN PATENT DOCUMENTS

JP      H11-312038 A    11/1999
JP      2011-239075 A   11/2011

*Primary Examiner* — John B Walsh
(74) *Attorney, Agent, or Firm* — IP Business Solutions, LLC (57) ABSTRACT

A terminal device includes a first communication device, a display device, and a first control device. The first control device functions as a display controller. The display controller allows the display device to display a first massage in a message display area of the display device. When the first message is not a high-importance message and the display controller then receives through the first communication device a second message sent from the information processing apparatus, the display controller allows the display device to execute first processing of scrolling a displayed image in the message display area and displaying the second message in the message display area. When the first message is a high-importance message and the display controller then receives the second message through the first communication device, the display controller allows the display device to execute second processing different from the first processing.

11 Claims, 9 Drawing Sheets

(51) Int. Cl.
  *H04L 51/04* (2022.01)
  *G06F 16/31* (2019.01)
  *G06F 3/0485* (2022.01)
  *H04L 51/224* (2022.01)

(56) References Cited

U.S. PATENT DOCUMENTS

2012/0005628 A1 1/2012 Isozu et al.
2017/0310625 A1* 10/2017 Hu .......................... H04L 51/04

* cited by examiner

TERMINAL DEVICE AND INFORMATION PROCESSING APPARATUS CAPABLE OF EXECUTING MESSAGE DISPLAY PROGRAM THAT PERFORMS DIFFERENT TYPES OF PROCESSING BETWEEN WHEN HIGH-IMPORTANCE MESSAGE IS DISPLAYED ON DISPLAY DEVICE AND WHEN HIGH-IMPORTANCE MESSAGE IS NOT DISPLAYED ON DISPLAY DEVICE, AND NON-TRANSITORY COMPUTER-READABLE RECORDING MEDIUM WITH MESSAGE DISPLAY PROGRAM STORED THEREON

INCORPORATION BY REFERENCE

This application claims priority to Japanese Patent Application No. 2020-082588 filed on 8 May 2020, the entire contents of which are incorporated by reference herein.

BACKGROUND

The present disclosure relates to terminal devices and information processing apparatuses capable of executing a message display program that enables communication in a chat or like format among a plurality of persons, and non-transitory computer-readable recording media with the message display program stored thereon.

Recently, a chat is widely used as a communication tool. A chat is a tool for making communications, including not only a one-to-one conversation but also simultaneous conversions among a plurality of persons, via a network, such as the Internet.

When a message is posted from a terminal device (for example, a PC (personal computer)) using a group chat, the posted message is displayed in respective message display areas (for example, windows) formed on the displays of the other terminal devices belonging to the chat group.

When receiving a new message, a general terminal device scrolls a displayed image in the message display area and then displays the newly received message in the message display area. If in such a terminal device messages are frequently posted, scrolling continuously occurs.

SUMMARY

A technique improved over the aforementioned technique is proposed as one aspect of the present disclosure.

A terminal device according to an aspect of the present disclosure includes a first communication device, a display device, and a first control device. The first communication device is capable of doing data communication with an information processing apparatus provided outside of the terminal device. The first control device includes a processor and functions as a display controller through the processor operating according to a control program. The display controller allows the display device to display a first massage in a message display area of the display device. When the first message is not a high-importance message and the display controller then receives through the first communication device a second message sent from the information processing apparatus, the display controller allows the display device to execute first processing of scrolling a displayed image in the message display area and displaying the second message in the message display area. When the first message is a high-importance message and the display controller then receives the second message through the first communication device, the display controller allows the display device to execute second processing different from the first processing.

An information processing apparatus according to another aspect of the present disclosure includes a second communication device and a second control device. The second communication device is capable of doing data communication with a terminal device provided outside of the information processing apparatus. The second control device includes a processor and functions as an importance determiner and an importance sender through the processor operating according to a control program. When receiving, through the second communication device, display time information sent from the terminal device and indicating an amount of display time of each individual first message during which the first message has been displayed on the terminal device, the importance determiner determines a degree of importance of the first message, based on the amount of display time of the first message indicated by the display time information, so that the degree of importance increases with increase in the amount of display time. The importance sender sends importance information showing the degree of importance determined by the importance determiner through the second communication device to the terminal device.

A non-transitory computer-readable recording medium according to still another aspect of the present disclosure stores a message display program. The message display program allows a computer included in a terminal device, the terminal device including a first communication device capable of doing data communication with an information processing apparatus provided outside of the terminal device and a display device, to function as a display controller. The display controller allows the display device to display a first massage in a message display area of the display device. When the first message is not a high-importance message and the display controller then receives through the first communication device a second message sent from the information processing apparatus, the display controller allows the display device to execute first processing of scrolling a displayed image in the message display area and displaying the second message in the message display area. When the first message is a high-importance message and the display controller then receives the second message through the first communication device, the display controller allows the display device to execute second processing different from the first processing.

DETAILED DESCRIPTION

Figure 1:
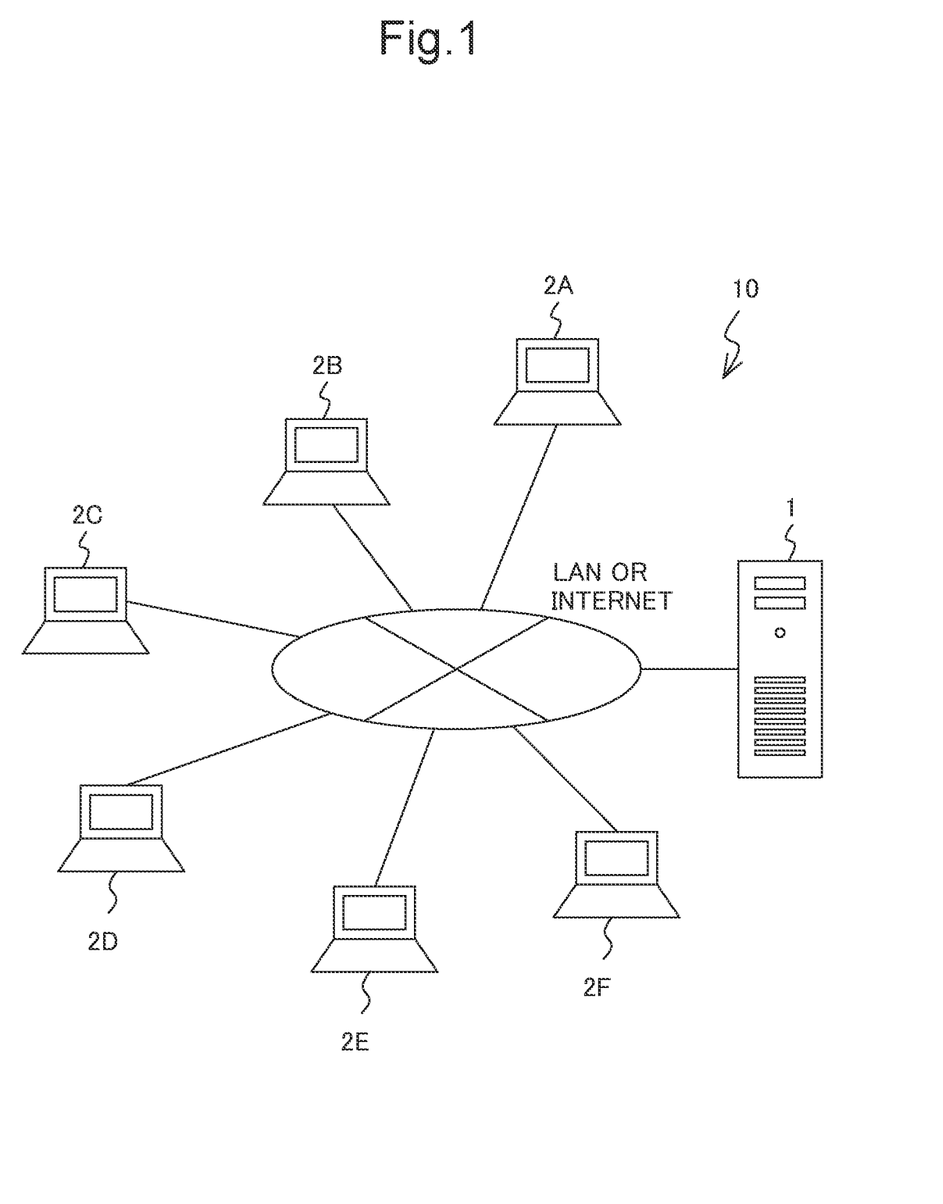
FIG. 1 is a view showing the whole of an information processing system made up by including: terminal devices that execute a message display program according to a first embodiment of the present disclosure; and an information processing apparatus.

Hereinafter, a description will be given of: a terminal device that executes a message display program according to an embodiment of the present disclosure; and an information processing apparatus, with reference to the drawings. FIG. 1 is a view showing the whole of an information processing system made up by including: terminal devices that execute a message display program according to a first embodiment of the present disclosure; and an information processing apparatus.

An information processing system 10 is made up by including: an information processing apparatus 1 and a plurality of terminal devices 2A to 2F (hereinafter, also referred to collectively as "terminal devices 2"), all of which are present on a network, such as the Internet.

The information processing apparatus 1 is, for example, a server. The information processing apparatus 1 does data communication with the plurality of terminal devices 2. The information processing apparatus 1 is capable of sending a message received from one terminal device 2 to the other terminal devices 2 and thus implements a chat system. For example, the information processing apparatus 1 sends a message received from the terminal device 2A to the other terminal devices 2B to 2F. The terminal device 2 is, for example, a PC (personal computer).

Figure 2:
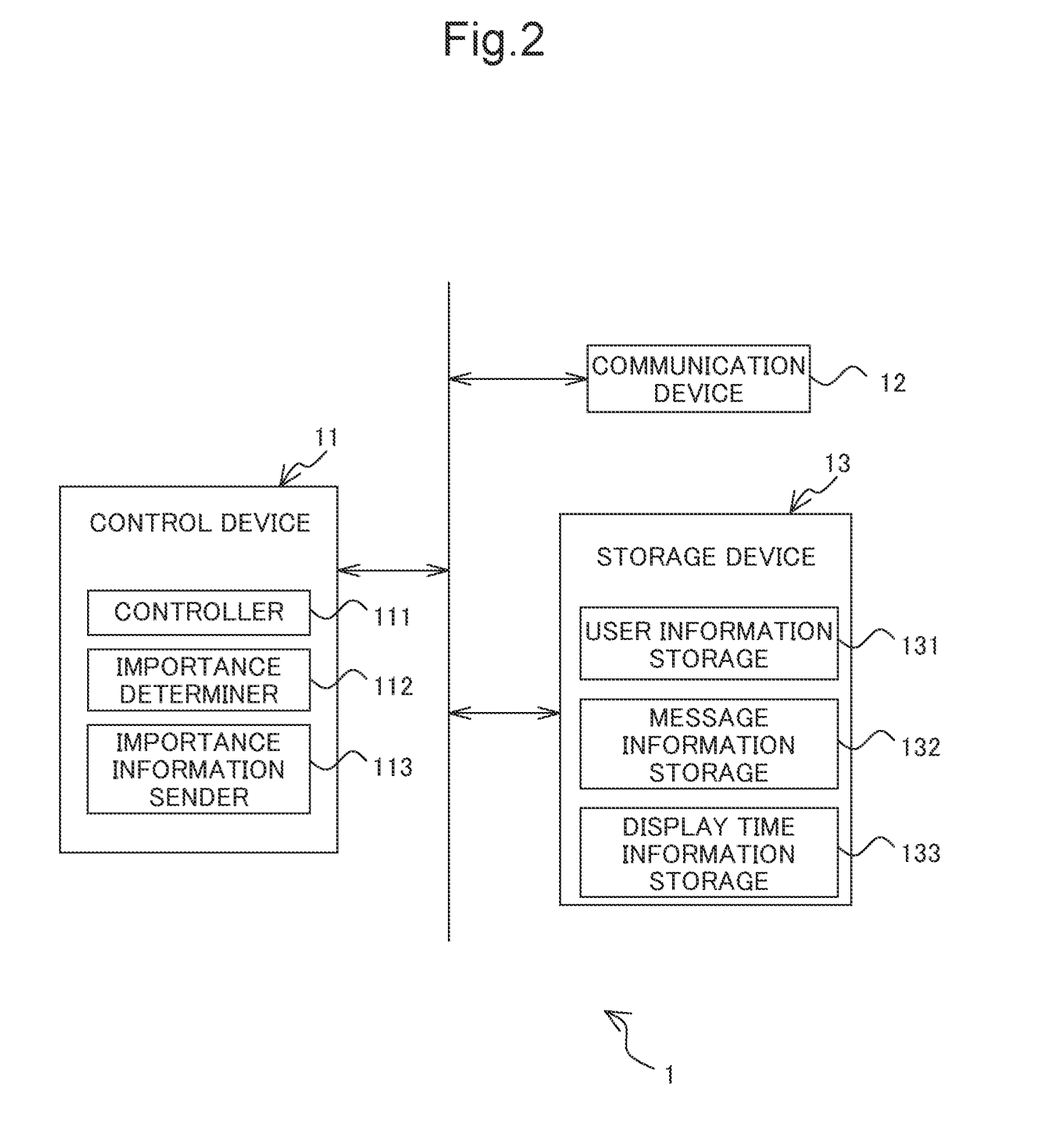
FIG. 2 is a functional block diagram schematically showing an essential internal configuration of the information processing apparatus.

FIG. 2 is a functional block diagram schematically showing an essential internal configuration of the information processing apparatus 1. The information processing apparatus 1 includes a control device 11, a communication device 12, and a storage device 13.

The communication device 12 is a communication interface that does data communication with external devices within a local area or on the Internet (i.e., devices provided outside of the information processing apparatus 1). For example, the communication device 12 does data communication with the terminal devices 2.

The storage device 13 is an HDD (hard disk drive), an SSD (solid state drive) or the like. The storage device 13 stores various types of control programs. The storage device 13 includes, as storage areas, a user information storage 131, a message information storage 132, and a display time information storage 133.

The user information storage 131 stores user information on users who do chats. The user information storage 131 stores, as user information on each individual user, a user name, a user icon representing the user, and so on in association with a user identification code for the user.

The message information storage 132 stores message information showing individual messages sent through the communication device 12 from the terminal devices 2. The message information on each individual message includes, not only the message, but also a user identification code for a user having sent the message and a sent time when the message has been sent from the terminal device 2.

The display time information storage 133 stores, for each individual message, display time information indicating an amount of display time which is an amount of time during which the message has been continued to be displayed on the terminal devices 2. For example, when a message has been displayed for 100 seconds on the terminal device 2A, displayed for 40 seconds on the terminal device 2B, and displayed for 30 seconds on the terminal device 2C, but not yet been displayed on the terminal devices 2D to 2F, the amount of display time of the message on the terminal devices 2 is 170 seconds in total. The display time information indicating the amount of display time of the individual message on each terminal device 2 is sent from the each terminal device 2 as will be described in detail hereinafter.

The control device 11 is made up by including a processor, a RAM (random access memory), a ROM (read only memory), and a dedicated hardware circuit. The processor is, for example, a CPU (central processing unit), an ASIC (application specific integrated circuit), an MPU (micro processing unit) or the like.

When the above processor operates according to a control program stored in the storage device 13, the control device 11 functions as a controller 111, an importance determiner 112, and an importance information sender 113.

The controller 111 governs the overall operation control of the information processing apparatus 1. The controller 111 is connected to the communication device 12 and the storage device 13. The controller 111 controls the operations of the above components connected thereto and transfers signals or data to and from these components.

When receiving through the communication device 12 message information containing a message sent from each terminal device 2, the controller 111 allows the message information storage 132 to store the message information. Furthermore, when receiving through the communication device 12 display time information sent from each terminal device 2, the controller 111 tallies the amount of display time of each individual message and allows the display time information storage 133 to store the total amount of display time of the each individual message.

Furthermore, the controller 111 sends, together with the message and the sent time both contained in the message information sent from each terminal device 2, the user icon associated with the user identification code through the communication device 12 to the other terminal devices 2. Thus, for example, the controller 111 can send a message received from one terminal device 2A to the other terminal devices 2B to 2F.

The importance determiner 112 determines the degree of importance of each message, based on the amount of display time of the message indicated by the display time information stored in the display time information storage 133, so that the degree of importance increases with the increase in the amount of display time (i.e., with the increase in the amount of users' browsing time). For example, when the amount of display time of a message is equal to or longer than a predetermined amount of time, the importance determiner 112 determines that the message is of high importance.

The amount of users' browsing time of a low-importance message is assumed to be short, while on the contrary the amount of users' browsing time of a high-importance message is assumed to be long. In other words, a message which the users browse for a long time is assumed to be of high importance. The determination of the degree of importance is based on these findings.

The importance information sender 113 sends importance information showing the degree of importance determined by the importance determiner 112 through the communication device 12 to the terminal devices 2. Specifically, when a message determined to be of high importance by the importance determiner 112 newly appears, the importance information sender 113 sends importance information showing that the message is of high importance through the communication device 12 to the terminal devices 2.

Figure 3:
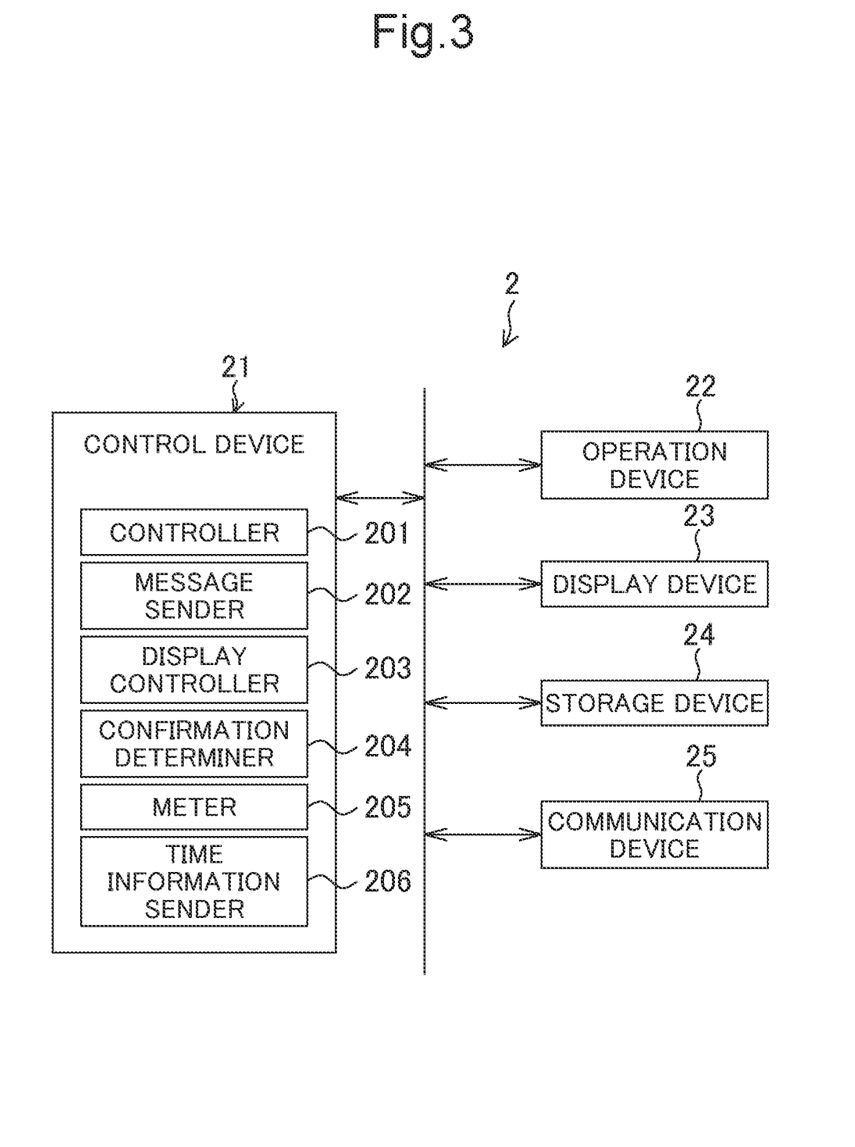
FIG. 3 is a functional block diagram schematically showing an essential internal configuration of the terminal device.

FIG. 3 is a functional block diagram schematically showing an essential internal configuration of the terminal device 2 that executes the message display program according to the first embodiment. The terminal device 2 includes a control device 21, an operation device 22, a display device 23, a storage device 24, and a communication device 25. These components are capable of transferring data or signals to and from each other via a communication bus.

The operation device 22 is formed of a keyboard, a mouse or any other operation device. The operation device 22 is used for inputting a command or characters into the control device 21 and manipulating a pointer on the screen of the display device 23. The operation device 22 accepts an input of an instruction based on a user's operation. The display device 23 is formed of an LCD (liquid crystal display) or the like and displays a response or a data result from the control device 21.

The storage device 24 is an HDD, an SSD or the like. The storage device 24 stores various types of control programs. The communication device 25 is a communication interface that does data communication with external devices within a local area or on the Internet (i.e., devices provided outside of the terminal device 2). For example, the communication device 25 does data communication with the information processing apparatus 1.

The control device 21 is made up by including a processor, a RAM, a ROM, and a dedicated hardware circuit. The processor is, for example, a CPU, an ASIC, an MPU or the like.

When the above processor operates according to a control program (for example, the message display program according to the present disclosure) stored in the storage device 24, the control device 21 functions as a controller 201, a message sender 202, a display controller 203, a confirmation determiner 204, a meter 205, and a time information sender 206. The above message display program implements the exchange of messages (i.e., chatting) with the other terminal devices 2.

The controller 201 governs the overall operation control of the terminal device 2. The controller 201 is connected to the operation device 22, the display device 23, the storage device 24, and the communication device 25. The controller 201 controls the operations of the above components connected thereto and transfers signals or data to and from these components.

For example, when the operation device 22 accepts a user's instruction requesting to do a chat, the controller 201 allows the display device 23 to form a message display area for displaying a user's message. Specifically, the controller 201 allows the display device 23 to form a window W1 (the message display area) for chatting as shown in FIG. 4.

Figure 4:
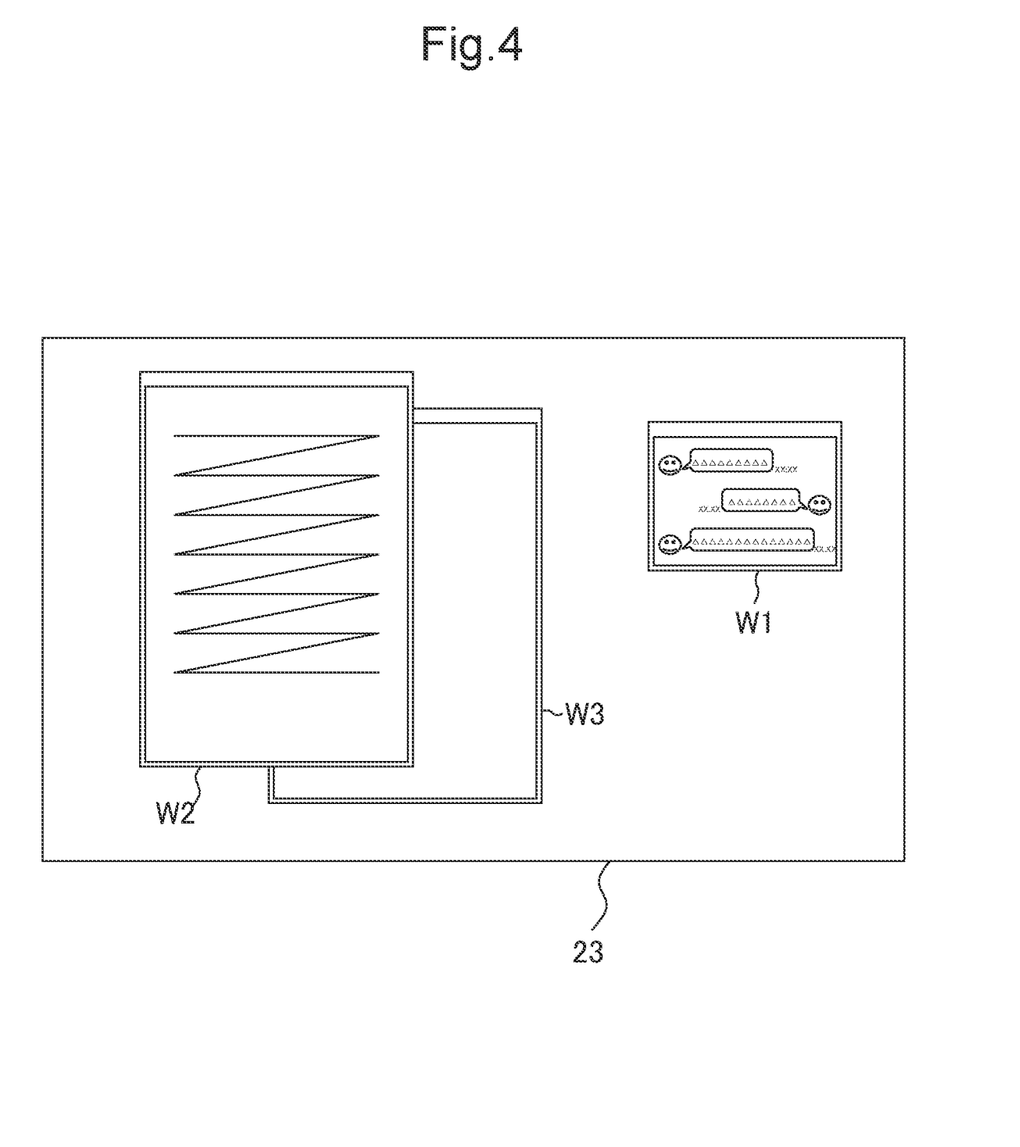
FIG. 4 is a view showing an example of a state where a plurality of windows are displayed on a display device.

FIG. 4 is a view showing an example of a state where the window W1 is formed on the display device 23. In this case, the display controller 203 allows the display device 23 to display, not only the window W1 for chatting, but also windows W2 and W3 for use in executing other programs.

The display controller 203 allows the display device 23 to display in the window W1 a message input by the user and accepted by the operation device 22. The message sender 202 sends message information containing the message input by the user through the communication device 25 to the information processing apparatus 1. The message information contains, as described previously, not only the message but also a user identification cord and a sent time of the message.

When receiving a new message, its sent time, and a user icon of a user as a source of the message (i.e., a message poster), all of which have been sent from the information processing apparatus 1, the display controller 203 allows the display device 23 to scroll the displayed image in the window W1 (the message display area) and display the new incoming message in the window W1. In other words, the display controller 203 allows the display device 23 to display a message posted from another terminal device 2 in the window W1 formed on the display device 23. In this manner, the exchange of messages with the other terminal devices 2 can be implemented.

The display controller 203 allows the display device 23 to display not only messages posted from the other terminal devices 2 but also messages sent by the message sender 202 (i.e., messages posted from the terminal device 2 itself) in the window W1 formed on the display device 23. Furthermore, the display controller 203 allows the display device 23 to display the user icons of the posters of the messages posted from the other terminal devices 2 on the left side of the window W1 and display the user icons of the poster (i.e., the user themself) of the messages posted from the terminal device 2 itself on the right side of the window W1.

Figure 5:
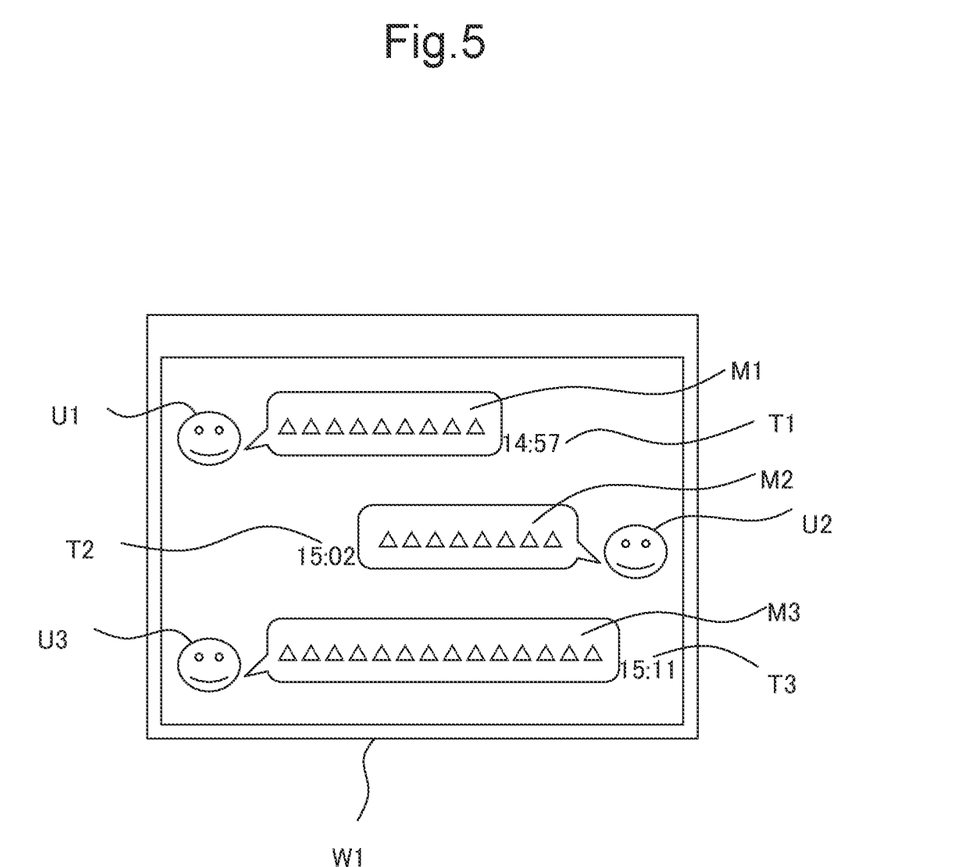
FIG. 5 is a view showing an example of a state where messages are displayed in a window.

FIG. 5 is a view showing an example of a state where messages are displayed in the window W1. The display controller 203 allows the display device 23 to display messages M1 to M3 in the window W1 and also display, in association with each of the messages M1 to M3, user icons U1 to U3 of the message posters and sent times T1 to T3 of the messages in the window W1.

Because the user icons U1 and U3 are displayed on the left side of the window W1, the user of the terminal device 2 itself can recognize that the messages M1 and M3 have been posted from the other terminal devices 2. Furthermore, because the user icon U2 is displayed on the right side of the window W1, the user of the terminal device 2 itself can recognize that the message M2 has been posted from the terminal device 2 itself.

In allowing the display device 23 to display a high-importance message in the window W1, the display controller 203 changes the display manner for the message to a predetermined display manner different from a normal display manner. For example, while allowing the display device 23 to display a high-importance message in the window W1, the display controller 203 keeps the display device 23 from scrolling for displaying a new message in the window W1 unless the confirmation determiner 204 determines that the high-importance message has been confirmed by the user. In this manner, the display of the message is performed in the predetermined display manner.

For example, when the message M3 (see FIG. 5) being displayed in the window W1 is of high importance, even if a new message has been received through the communication device 25, the display controller 203 keeps the display device 23 from scrolling in the window W1 until the terminal device 2 reaches a state where the user has confirmed the message M3. In other words, the display controller 203 keeps the display device 23 from displaying the new message until the message M3 has been confirmed by the user.

Figure 6:
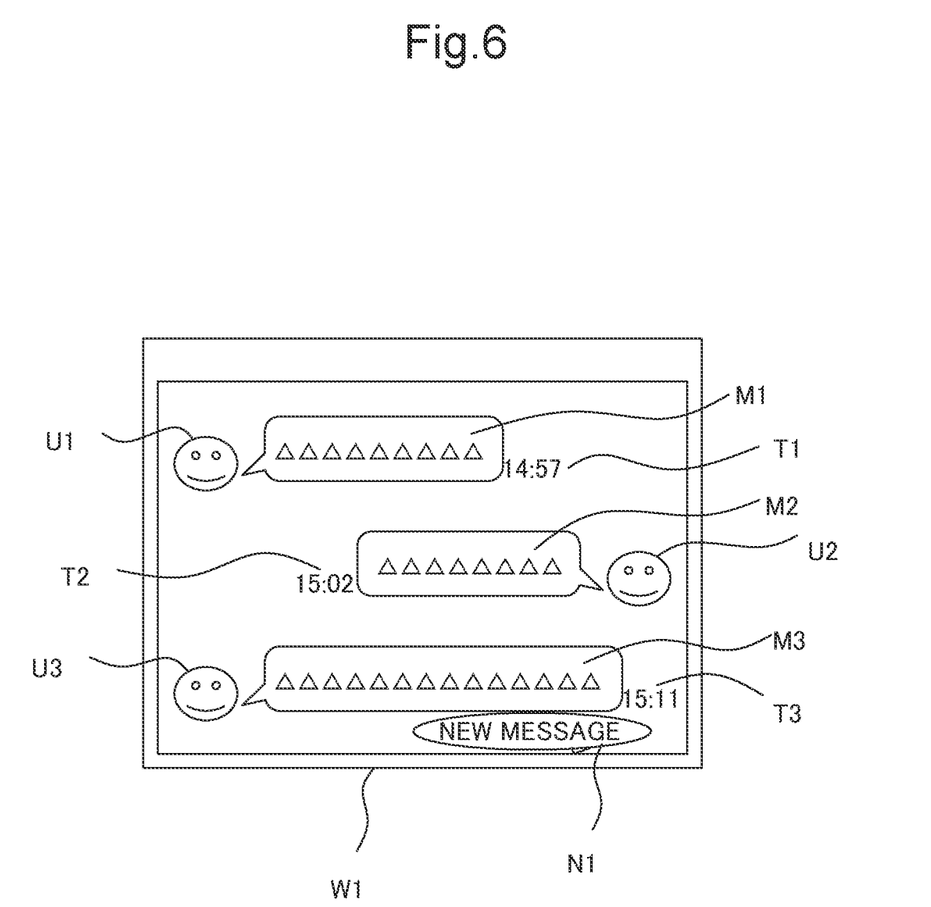
FIG. 6 is a view showing another example of a state where messages are displayed in the window.

In this case, as shown in FIG. 6, the display controller 203 may allow the display device 23 to display, at the bottom of the window W1, a notification icon N1 showing the presence of an undisplayed message, for example, an icon saying "New Message", to bring the presence of the undisplayed message to user's attention.

The determination of whether or not a high-importance message is being displayed in the window W1 is made by the display controller 203, for example, based on importance information sent from the information processing apparatus 1 and received through the communication device 25.

The confirmation determiner 204 determines, based on the degree of attention of the user to the high-importance message being displayed in the window W1, whether or not the user has confirmed the high-importance message. For example, when the window W1 is active (for example, when the mouse pointer is on the window W1 and the window W1 is subject to a user's operation), it can be said that the message being displayed in the window W1 is highly likely to draw attention from the user. Therefore, when the confirmation determiner 204 determines whether or not the window W1 is active and, as a result, the window W1 is active, the confirmation determiner 204 determines that the user has confirmed the high-importance message being displayed in the window W1. On the other hand, when the window W1 is inactive, the confirmation determiner 204 determines that the user has not yet confirmed the message being displayed in the window W1.

The meter 205 measures, on a message-by-message basis, the amount of display time indicating the amount of time during which the message has been displayed in the window W1.

The amount of display time is associated significantly with the amount of browsing time during which the user has browsed the message. However, even if the message is displayed in the window W1, the user does not necessarily actually browse and pay attention to the message. For example, as shown in FIG. 4, when a plurality of windows W1 to W3 are displayed on the display device 23 and the user does a task using the window W2 different from the window W1, it cannot be said that the user pays attention to the message being displayed in the window W1.

In view of this, in another embodiment, the meter 205 may measure the amount of display time during which the message has been displayed in the window W1 in an active state but not measure the amount of display time during which the message has been displayed in the window W1 in an inactive state.

The time information sender 206 sends display time information indicating the amount of display time of each individual message measured by the meter 205 through the communication device 25 to the information processing apparatus 1.

Figure 7:
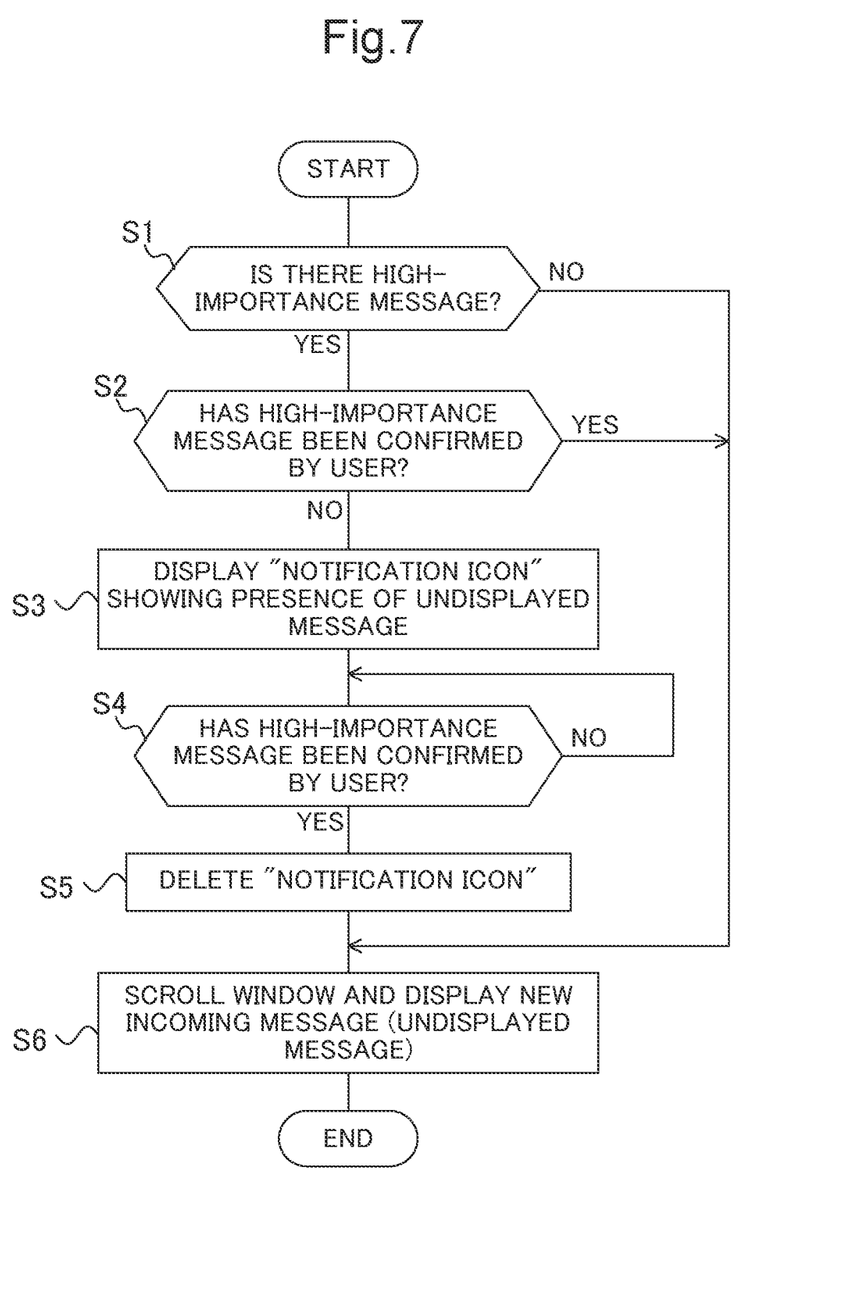
FIG. 7 is a flowchart showing message display processing according to the first embodiment.

Next, a description will be given of an example of message display processing performed by the control device 21 of the terminal device 2 executing the message display program according to the first embodiment, with reference to the flowchart shown in FIG. 7. When the control device 21 runs the above message display program, allows the display device 23 to form the window W1, and, in this state, receives a new message through the communication device 25, it executes the message display processing.

The display controller 203 determines whether or not a high-importance message is being displayed in the window W1 (step S1). When the display controller 203 determines that a high-importance message is being displayed in the window W1 (YES in step S1), the confirmation determiner 204 determines whether or not the user has confirmed the high-importance message (step S2).

When the confirmation determiner 204 determines that the user has not yet confirmed the high-importance message (NO in step S2), the display controller 203 allows the display device 23 to keep the high-importance message displayed in the window W1, without scrolling the displayed image in the window W1, and display a notification icon N1 saying "New Message" representing the presence of an undisplayed message at the bottom of the window W1 (step S3). Thereafter, the confirmation determiner 204 determines whether or not the user has confirmed the high-importance message (step S4). At this point in time, the display controller 203 does not yet allow the display device 23 to display the new incoming message. The processing in step S3 corresponds to the second processing defined in CLAIMS.

When the confirmation determiner 204 determines that the user has confirmed the high-importance message (YES in step S4), the display controller 203 allows the display device 23 to delete the notification icon N1 from the window W1 (step S5). Thereafter, the display controller 203 allows the display device 23 to scroll the displayed image in the window W1 and display the undisplayed message (the above-described new incoming message) in the window W1 (step S6). After the processing in step S6, the control device 21 ends the message display processing. The processing in step S6 corresponds to the first processing defined in CLAIMS.

When in step S1 the display controller 203 determines that no high-importance message is being displayed in the window W1 (NO in step S1), it allows the display device 23 to scroll the displayed image in the window W1 and display the new incoming message in the window W1 (step S6). After the processing in step S6, the control device 21 ends the message display processing.

When in step S2 the confirmation determiner 204 determines that the user has confirmed the high-importance message (YES in step S2), the display controller 203 allows the display device 23 to scroll the displayed image in the window W1 and display the new incoming message in the window W1 (step S6). After the processing in step S6, the control device 21 ends the message display processing. In this case, since the user has already confirmed the high-importance message, the display controller 203 need not forbid scrolling in the window W1.

The display controller 203 allows the display device 23 to scroll (up or down) in the window W1 based on a user's scroll instruction to scroll in the window W1 accepted by the operation device 22 and according to the amount of scrolling specified by the scroll instruction.

Figure 8:
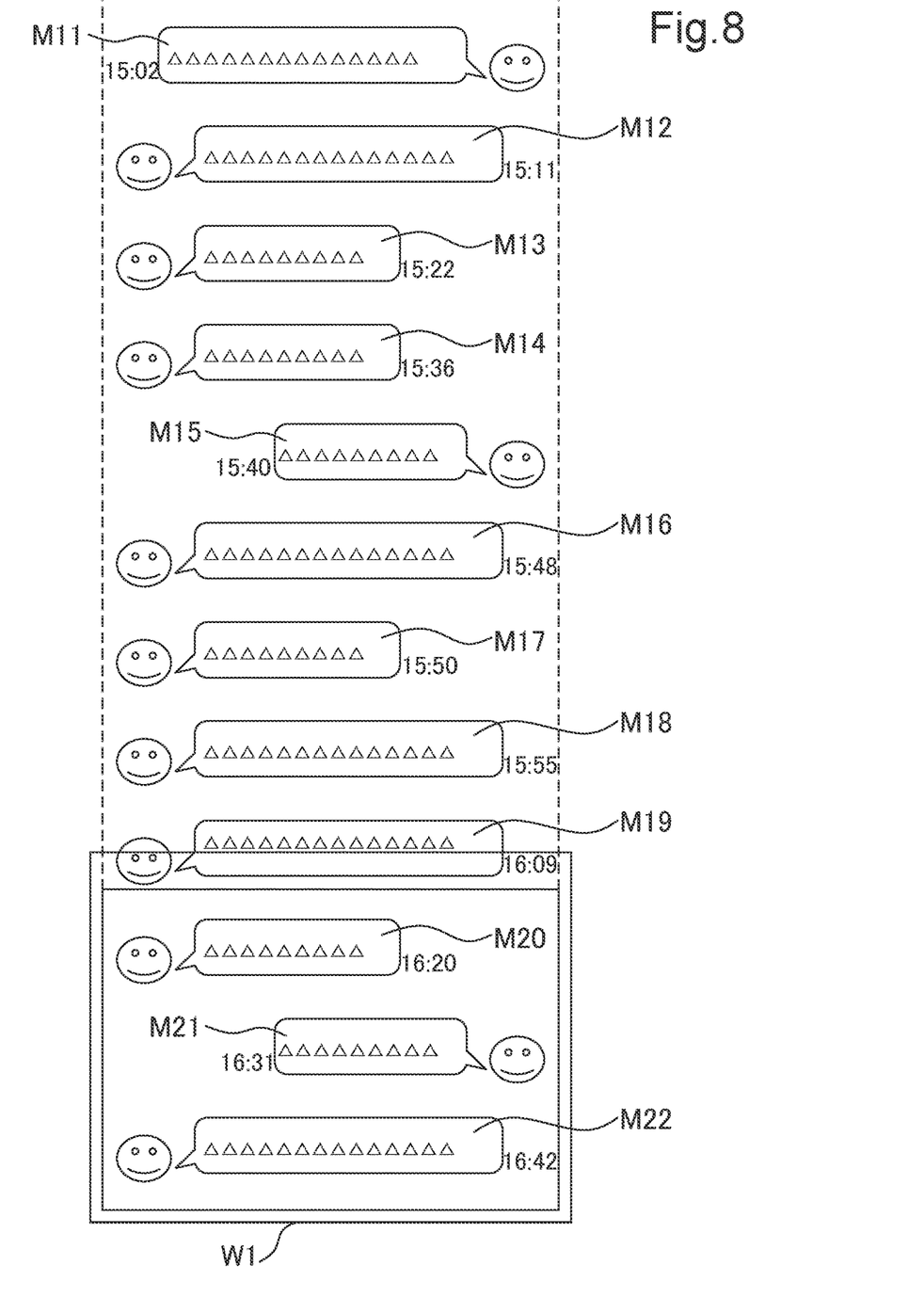
FIG. 8 is a view showing still another example of a state where messages are displayed in the window.

For example, suppose that, as shown in FIG. 8, messages M20 to M22 are displayed in the window W1 and messages M11 to M19 sent earlier than the messages M20 to M22 are hidden behind the top of the window W1. When, in this state, the operation device 22 accepts a user's gesture (for example, a downward flick) instructing to "scroll down" in the window W1, the display controller 203 allows the display device 23 to "scroll down" according to the amount of scrolling (for example, a flick speed) specified by the user. Thus, the messages having been hidden behind the top of the window W1 are displayed in the window W1.

In this regard, the display controller 203 allows the display device 23 to scroll in the window W1 when any high-importance message is hidden behind the top or bottom of the window W1. Once any hidden high-importance message becomes displayed in the window W1 by the scrolling, the display controller 203 allows the display device 23 to forcibly terminate the scrolling with the appearance of the high-importance message in the window W1 in order that the high-importance message is kept displayed in the window W1.

For example, when the user makes a flick gesture with intent to allow the message M12 to be displayed in the window W1, the display controller 203 allows the display device 23 to start scrolling down in the window W1 in order to display the message M12 in the window W1 in response to the flick gesture. However, if the message M16 present in the middle of the scroll-down is of high importance, the display controller 203 allows the display device 23 to forcibly terminate the scrolling with the appearance of the message M16 in the window W1 due to the scroll-down and keep the message M16 displayed in the window W1. In other words, the display controller 203 prevents the display device 23 from scrolling to the point that the message M12 is displayed in the window W1. Thus, the display controller 203 allows the display device 23 to preferentially display a high-importance message.

In another embodiment, when the operation device 22 accepts a user's scroll instruction, the display controller 203 may allow the display device 23 to scroll the displayed image in the window W1 until a high-importance message becomes displayed in the window W1 and stop the scrolling with the appearance of the high-importance message in the window W1. Thus, a high-importance message can be efficiently displayed in the window W1.

When in the above-described general terminal device scrolling continuously occurs, messages are scrolled through even though the user has not yet confirmed them, so that messages not yet confirmed by the user fall outside the message display area and are hidden. In short, when scrolling continuously occurs, the user may overlook the messages.

If a low-importance message is overlooked, this could be said to be a relatively minor problem. However, if a high-importance message is overlooked, this cannot be said to be a minor problem. In order for the user to browse a message falling outside the message display area, it may be sufficient that the user gives a scroll instruction and thus allows the display device to scroll through the message display area. However, scrolling through the message display area is a burden on the user. In addition, even if the user gives a scroll instruction and thus allows the display device to scroll through the message display area, the user cannot always confirm a high-importance message without overlooking it.

There is known as a general technique a technique in which in performing a scroll display according to a user's instruction, the scrolling speed of a high-importance portion is slowed down. However, the general technique is disclosed on the assumption of manual scrolling according to a user's instruction, but not on the assumption of automatic scrolling. Therefore, the general technique is not designed assuming overlooking of a high-importance message that may be caused by automatic scrolling.

Contrastingly, in the above-described first embodiment, in displaying a high-importance message in the window W1, the display manner for the message is changed to a different manner from the normal display manner, which makes it easy for the user to pay attention to the high-importance message. Thus, in making the exchange of messages with other terminal devices, it can be prevented that the user overlooks a high-importance message.

Although the description in the above first embodiment has been given of the case where the display controller 203 executes processing for limiting the scrolling to make the display manner for messages different from the normal display manner, the method for making the display manner for messages different from the normal display manner is not limited to the above method.

In another embodiment, the display controller 203 may allow the display device 23 to make the display manner for messages different from the normal display manner by dividing the message display area into two separate viewing areas and separately displaying high-importance messages in one of the viewing areas and less important messages in the other viewing area.

For example, the display controller 203 may allow the display device 23 to divide the window W1 to form a new viewing area and display high-importance messages in the new viewing area formed by the division of the window W1. Alternatively, the display controller 203 may allow the display device 23 to pop up a new window and display high-importance messages in the new pop-up window.

Figure 9:
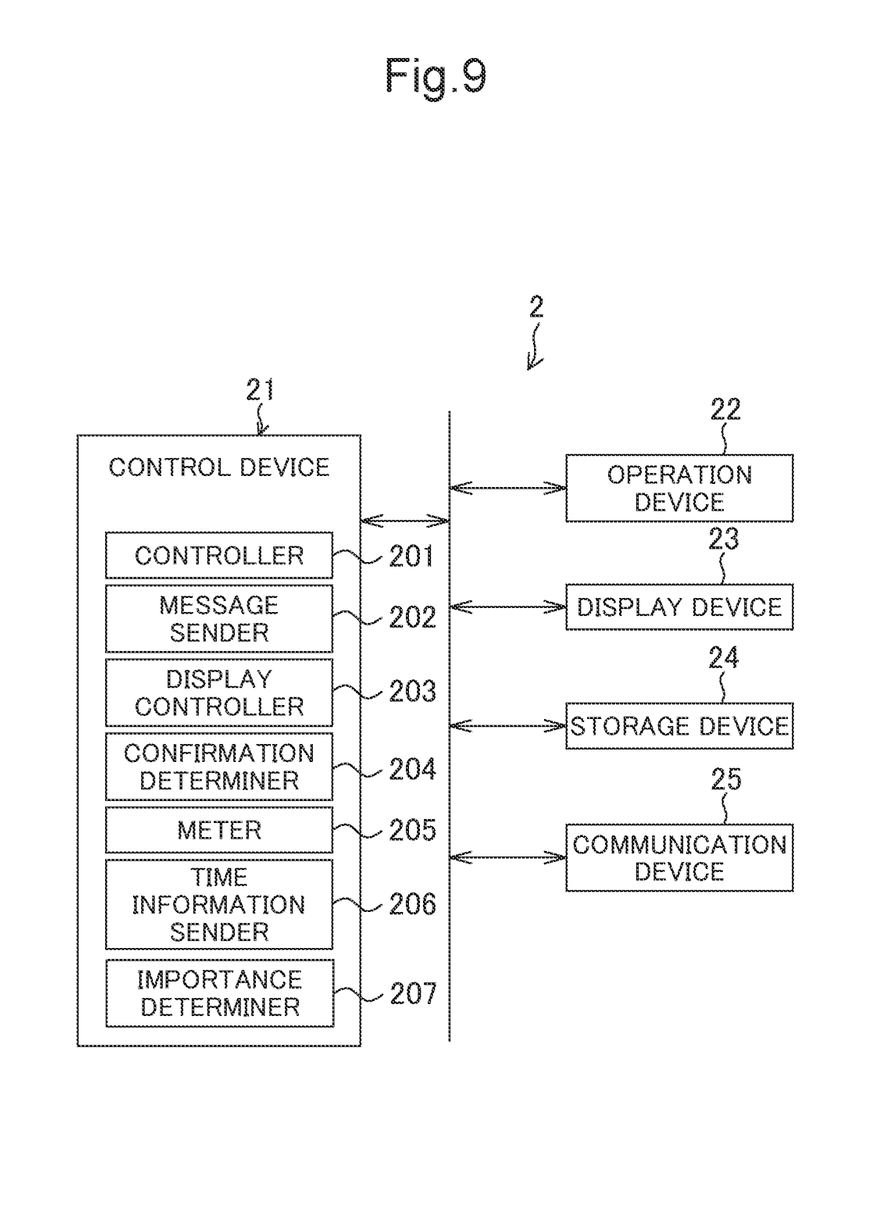
FIG. 9 is a functional block diagram schematically showing an essential internal configuration of a terminal device that executes a message display program according to a second embodiment.

FIG. 9 is a functional block diagram schematically showing an essential internal configuration of a terminal device that executes a message display program according to a second embodiment. The terminal device 2 that executes a message display program according to a second embodiment is different from the terminal device 2 according to the first embodiment shown in FIG. 3 in that the control device 21 includes an importance determiner 207, and the other configurations of the terminal device 2 according to this embodiment are the same as in the first embodiment. In the second embodiment, the display controller 203 of the terminal device 2 changes the display manner for messages to the predetermined display manner, not based on importance information sent from the information processing apparatus 1, according to a determination result of the importance determiner 207.

The importance determiner 207 determines the degree of importance of each message. Examples of the determination method for determining the degree of importance of each message include the following three methods.

<Determination Method 1>

The importance determiner 207 determines the degree of importance of each message, based on date and time information contained in the message, from the relationship between the date and time indicated by the date and time information and the current date and time.

For example, assume that the message M1 contains a description of "A meeting at 15:00, April 8 at . . . ", the message M2 contains a description of "Visit to . . . at 16:00, April 2", and each of these messages also contains the date and time information. If the current date is April 5, the date and time "15:00, April 8" indicated by the date and time information contained in the message M1 has not yet come and, therefore, the importance determiner 207 determines that the message M1 is of high importance. On the other hand, the date and time "16:00, April 2" indicated by the date and time information contained in the message M2 has already passed and, therefore, the importance determiner 207 determines that the message M2 is not of high importance.

<Determination Method 2>

The importance determiner 207 extracts a character string contained in each message currently being displayed in the window W1 and determines any message containing the same character string as the extracted character string to be of high importance.

For example, if one or more messages currently being displayed in the window W1 contain a character string "ABC Exhibition", the user may have an interest in "ABC Exhibition". In consideration of this, the importance determiner 207 determines that the messages containing a character string "ABC Exhibition" are of high importance. When the operation device 22 accepts a user's scroll instruction, the display controller 203 forcibly terminates the scrolling with the appearance of a message containing a character string "ABC Exhibition" in the window W1 due to the scrolling, and keeps the message containing a character string "ABC Exhibition" displayed in the window W1.

<Determination Method 3>

Based on the amount of display time of each message measured by the meter 205, the importance determiner 207 determines, as for messages of which the amounts of display time are equal to or more than a predetermined threshold value (for example, 30 seconds), these messages to be of low importance, because they are highly likely to be browsed for a long time by the user even if they have been previously determined to be of high importance. In other words, the importance determiner 207 determines that messages of which the amounts of display time measured on a message-by-message basis by the meter 205 are equal to or more than the predetermined threshold value and which have been determined to be of high importance before the measurement are low-importance messages. On the other hand, when the amount of display time of a message is less than the predetermined threshold value, the importance determiner 207 determines the message to be of high importance.

Thus, even high-importance messages are determined to be of low importance if they have already been sufficiently confirmed by the user. Therefore, messages previously determined to be of high importance can be prevented from being displayed more preferentially than necessary.

Meanwhile, if the amount of display time of a short message composed of, for example, 10 characters is 30 seconds, it can be said that the message draws attention from the user and its degree of importance is high. However, even if the amount of display time of a long message composed of 100 or more characters is 30 seconds likewise, it is difficult to say that the message draws attention from the user. In view of this, the importance determiner 207 may set the threshold value at a larger value with increase in the number of characters constituting a message.

The structures, configurations, and processing described in the above embodiments with reference to FIGS. 1 to 9 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. A terminal device comprising:
a first communication device capable of doing data communication with an information processing apparatus provided outside of the terminal device;
a display device; and
a first control device that includes a processor and functions, through the processor operating according to a control program, as a display controller that allows the display device to display a first message in a message display area of the display device, wherein
when the first message is not a high-importance message and the display controller then receives through the first communication device a second message sent from the information processing apparatus, the display controller allows the display device to execute first processing of scrolling a displayed image in the message display area and displaying the second message in the message display area, and
when the first message is a high-importance message and the display controller then receives the second message through the first communication device, the display controller allows the display device to execute second processing different from the first processing,
wherein, when the first message is a high-importance message, the first control device further functions as a confirmation determiner that determines, based on a degree of attention of a user to the first message, whether or not the user has confirmed the first message,
the display controller allows the display device to execute, as the second processing, processing of keeping the first message displayed in the message display area, without scrolling the displayed image in the message display area, until the confirmation determiner determines that the user has confirmed the first message, and
when the confirmation determiner determines that the user has confirmed the first message, the display controller allows the display device to execute the first processing.

2. A terminal device comprising:
a first communication device capable of doing data communication with an information processing apparatus provided outside of the terminal device;
a display device; and
a first control device that includes a processor and functions, through the processor operating according to a control program, as a display controller that allows the display device to display a first message in a message display area of the display device, wherein
when the first message is not a high-importance message and the display controller then receives through the first communication device a second message sent from the information processing apparatus, the display controller allows the display device to execute first processing of scrolling a displayed image in the message display area and displaying the second message in the message display area, and
when the first message is a high-importance message and the display controller then receives the second message through the first communication device, the display controller allows the display device to execute second processing different from the first processing,
wherein when the first message is a high-importance message, the display controller allows the display device to execute, as the second processing, processing of dividing the message display area into two viewing areas and separately displaying the first message in one of the viewing areas and a less important message other than the first message in the other viewing area.

3. A terminal device comprising:
a first communication device capable of doing data communication with an information processing apparatus provided outside of the terminal device;
a display device; and
a first control device that includes a processor and functions, through the processor operating according to a control program, as a display controller that allows the display device to display a first message in a message display area of the display device, wherein
when the first message is not a high-importance message and the display controller then receives through the first communication device a second message sent from the information processing apparatus, the display controller allows the display device to execute first processing of scrolling a displayed image in the message display area and displaying the second message in the message display area, and when the first message is a high-importance message and the display controller then receives the second message through the first communication device, the display controller allows the display device to execute second processing different from the first processing, wherein the terminal device further comprising an operation device that accepts an instruction in response to an operation of the user, wherein, upon acceptance of a scroll instruction through the operation device, the display controller allows the display device to scroll the displayed image in the message display area according to an amount of scrolling specified by the scroll instruction, and when the first message becomes displayed in the message display area by the scrolling and the first message is a high-importance message, the display controller allows the display device to terminate the scrolling regardless of the amount of scrolling and keep the first message displayed in the message display area.

4. A terminal device comprising:
a first communication device capable of doing data communication with an information processing apparatus provided outside of the terminal device;
a display device; and
a first control device that includes a processor and functions, through the processor operating according to a control program, as a display controller that allows the display device to display a first message in a message display area of the display device, wherein when the first message is not a high-importance message and the display controller then receives through the first communication device a second message sent from the information processing apparatus, the display controller allows the display device to execute first processing of scrolling a displayed image in the message display area and displaying the second message in the message display area, and when the first message is a high-importance message and the display controller then receives the second message through the first communication device, the display controller allows the display device to execute second processing different from the first processing, wherein the terminal device further comprising an operation device that accepts an instruction in response to an operation of the user, wherein when the first message is a high-importance message and the display controller accepts a scroll instruction through the operation device, the display controller allows the display device to continue to scroll the displayed image in the message display area until the first message becomes displayed in the message display area, and stop the scrolling with appearance of the first message in the message display area.

5. A terminal device comprising:
a first communication device capable of doing data communication with an information processing apparatus provided outside of the terminal device;
a display device; and
a first control device that includes a processor and functions, through the processor operating according to a control program, as a display controller that allows the display device to display a first message in a message display area of the display device, wherein when the first message is not a high-importance message and the display controller then receives through the first communication device a second message sent from the information processing apparatus, the display controller allows the display device to execute first processing of scrolling a displayed image in the message display area and displaying the second message in the message display area, and when the first message is a high-importance message and the display controller then receives the second message through the first communication device, the display controller allows the display device to execute second processing different from the first processing, wherein the display controller receives, through the first communication device, importance information showing a degree of importance of the first message and sent from the information processing apparatus and determines, based on the importance information, whether or not the first message is a high-importance message, wherein the first control device further functions as:
a meter that measures, for each of the first messages, an amount of display time indicating an amount of time during which the first message has been displayed in the message display area; and
a time information sender that sends, through the first communication device, display time information showing the amount of display time of the each first message measured by the meter to the information processing apparatus, the information processing apparatus making a determination of the degree of importance of the first message based on the display time information and sending a result of the determination as the importance information.

6. A terminal device comprising:
a first communication device capable of doing data communication with an information processing apparatus provided outside of the terminal device;
a display device; and
a first control device that includes a processor and functions, through the processor operating according to a control program, as a display controller that allows the display device to display a first message in a message display area of the display device, wherein when the first message is not a high-importance message and the display controller then receives through the first communication device a second message sent from the information processing apparatus, the display controller allows the display device to execute first processing of scrolling a displayed image in the message display area and displaying the second message in the message display area, and when the first message is a high-importance message and the display controller then receives the second message through the first communication device, the display controller allows the display device to execute second processing different from the first processing, wherein the first control device further functions as an importance determiner that makes a determination of a degree of importance of the first message, and
the display controller executes the first processing or the second processing according to a result of the determination of the importance determiner, wherein the importance determiner extracts a character string contained in a message being displayed in the message display area and determines the first message to be of high importance when the first message contains a same character string as an extracted character string.

7. A terminal device comprising:

a first communication device capable of doing data communication with an information processing apparatus provided outside of the terminal device;

a display device; and a first control device that includes a processor and functions, through the processor operating according to a control program, as a display controller that allows the display device to display a first message in a message display area of the display device, wherein when the first message is not a high-importance message and the display controller then receives through the first communication device a second message sent from the information processing apparatus, the display controller allows the display device to execute first processing of scrolling a displayed image in the message display area and displaying the second message in the message display area, and when the first message is a high-importance message and the display controller then receives the second message through the first communication device, the display controller allows the display device to execute second processing different from the first processing, wherein the first control device further functions as an importance determiner that makes a determination of a degree of importance of the first message, and the display controller executes the first processing or the second processing according to a result of the determination of the importance determiner, wherein the first control device further functions as a meter that measures, for each of the first messages, an amount of display time indicating an amount of time during which the first message has been displayed in the message display area, when the amount of display time of the first message measured by the meter is equal to or more than a predetermined threshold value, the importance determiner determines that the first message is of high importance, and when the amount of display time of the first message is less than the threshold value, the importance determiner determines that the first message is of low importance.

8. The terminal device according to claim 7, wherein the importance determiner sets the threshold value at a larger value with increase in a number of characters constituting the message.

9. The terminal device according to claim 5, wherein the meter measures the amount of display time during which the first message has been displayed in the message display area in an active state, but keeps from measuring the amount of display time during which the first message has been displayed in the message display area in an inactive state.

10. The terminal device according to claim 1, wherein when the message display area is active, the confirmation determiner determines that the user has confirmed the first message being displayed in the message display area, and when the message display area is inactive, the confirmation determiner determines that the user has not yet confirmed the first message being displayed in the message display area.

11. An information processing apparatus comprising:

a second communication device capable of doing data communication with a terminal device provided outside of the information processing apparatus; and a second control device that includes a processor and functions, through the processor operating according to a control program, as: (a) an importance determiner that, when receiving through the second communication device display time information sent from the terminal device and indicating an amount of display time of each individual first message during which the first message has been displayed on the terminal device, determines a degree of importance of the first message, based on the amount of display time of the first message indicated by the display time information, so that the degree of importance increases with increase in the amount of display time, and (b) an importance sender that sends importance information showing the degree of importance determined by the importance determiner through the second communication device to the terminal device.

* * * * *